US012630971B2

(12) United States Patent
Doona et al.

(10) Patent No.: US 12,630,971 B2
(45) Date of Patent: May 19, 2026

(54) SELF-DECONTAMINATING, SELF-DEODORIZING TEXTILES AND SURFACES AND METHODS OF MAKING AND USING THE SAME

(71) Applicant: BRANDEIS UNIVERSITY, Waltham, MA (US)

(72) Inventors: Christopher J. Doona, Waltham, MA (US); Florence E. Feeherry, Waltham, MA (US); Irving R. Epstein, Waltham, MA (US); Kenneth Kustin, Waltham, MA (US)

(73) Assignee: BRANDEIS UNIVERSITY, Waltham, MA (US)

( * ) Notice: Subject to any disclaimer, the term of this patent is extended or adjusted under 35 U.S.C. 154(b) by 403 days.

(21) Appl. No.: 17/638,810

(22) PCT Filed: Aug. 28, 2020

(86) PCT No.: PCT/US2020/048490
§ 371 (c)(1),
(2) Date: Feb. 26, 2022

(87) PCT Pub. No.: WO2021/041871
PCT Pub. Date: Mar. 4, 2021

(65) Prior Publication Data
US 2022/0307194 A1    Sep. 29, 2022

Related U.S. Application Data

(60) Provisional application No. 62/894,018, filed on Aug. 30, 2019.

(51) Int. Cl.
*D06M 15/285* (2006.01)
*A01N 25/10* (2006.01)
*A01N 59/00* (2006.01)

(52) U.S. Cl.
CPC ........... *D06M 15/285* (2013.01); *A01N 25/10* (2013.01); *A01N 59/00* (2013.01)

(58) Field of Classification Search
CPC .... D06M 15/285; D06M 11/30; D06M 16/00; A01N 25/10; A01N 59/00; A01N 25/34
See application file for complete search history.

(56) References Cited

U.S. PATENT DOCUMENTS

| | | | |
|---|---|---|---|
| 4,504,442 A | 3/1985 | Rosenblatt et al. | |
| 4,681,739 A | 7/1987 | Rosenblatt et al. | |

(Continued)

FOREIGN PATENT DOCUMENTS

| | | |
|---|---|---|
| EP | 2962988 A1 | 1/2016 |
| WO | 2012080673 A1 | 6/2012 |

(Continued)

OTHER PUBLICATIONS

Kingsley, David H., et al. "Evaluation of gaseous chlorine dioxide for the inactivation of Tulane virus on blueberries." International Journal of Food Microbiology 273 (2018): 28-32.

(Continued)

*Primary Examiner* — Elizabeth M Imani
(74) *Attorney, Agent, or Firm* — Quarles & Brady, LLP

(57) ABSTRACT

An article comprising a substrate having a stimuli-responsive hydrogel polymer functionalized to or associated with a surface. The stimuli-responsive hydrogel polymer is at least partially hydrated by an aqueous disinfectant solution comprising a disinfectant. The disinfectant is formed-prior to hydrating the stimuli-responsive hydrogel polymer. At least a portion of the disinfectant is taken up, stored, or released as an aqueous solution or a gaseous vapor upon interaction with a stimulus.

28 Claims, 1 Drawing Sheet

100

102

104

(56) References Cited

U.S. PATENT DOCUMENTS

| | | | |
|---|---|---|---|
| 5,055,338 | A | 10/1991 | Sheth et al. |
| 5,234,678 | A | 8/1993 | Rosenblatt et al. |
| 6,432,322 | B1 | 8/2002 | Speronello et al. |
| 6,602,466 | B2 | 8/2003 | Hamilton et al. |
| 6,607,696 | B1 | 8/2003 | Hamilton et al. |
| 7,048,842 | B2 | 5/2006 | Tremblay et al. |
| 7,534,398 | B2 | 5/2009 | Dee et al. |
| 7,625,533 | B2 | 12/2009 | Doona et al. |
| 7,883,640 | B2 | 2/2011 | Doona et al. |
| 8,337,717 | B2 | 12/2012 | Doona et al. |
| 9,180,218 | B2 | 11/2015 | Kendig et al. |
| 9,333,475 | B1 | 5/2016 | Baseli et al. |
| 9,392,824 | B1 | 7/2016 | Leschinsky |
| 9,475,263 | B1 | 10/2016 | Rangan et al. |
| 9,517,934 | B2 | 12/2016 | Doona et al. |
| 10,626,016 | B2 | 4/2020 | Doona et al. |
| 2006/0073250 | A1 | 4/2006 | Mozaffar et al. |
| 2010/0018963 | A1 | 1/2010 | Rosenbauer et al. |
| 2012/0070508 | A1* | 3/2012 | Harrison ................ A01N 59/00 206/524.6 |
| 2013/0123563 | A1 | 5/2013 | Lee et al. |
| 2016/0058901 | A1 | 3/2016 | Bender et al. |
| 2019/0161349 | A1 | 5/2019 | Doona et al. |
| 2020/0239306 | A1 | 7/2020 | Doona et al. |

FOREIGN PATENT DOCUMENTS

| | | |
|---|---|---|
| WO | 2018177554 A1 | 10/2018 |
| WO | 2019043547 A2 | 3/2019 |

OTHER PUBLICATIONS

Kuznesof, P. M. "Sodium Dichloroisocyanurate (NaDCC—anhydrous and dihydrate)." Chemical and Technical Assessment 61st JECFA FAO (2004).

Lessa, Fernanda C., et al. "Burden of Clostridium difficile infection in the United States." New England Journal of Medicine 372.9 (2015): 825-834.

PCT/US2020/048490—International Search Report and Written Opinion—Dec. 2, 2020.

* cited by examiner

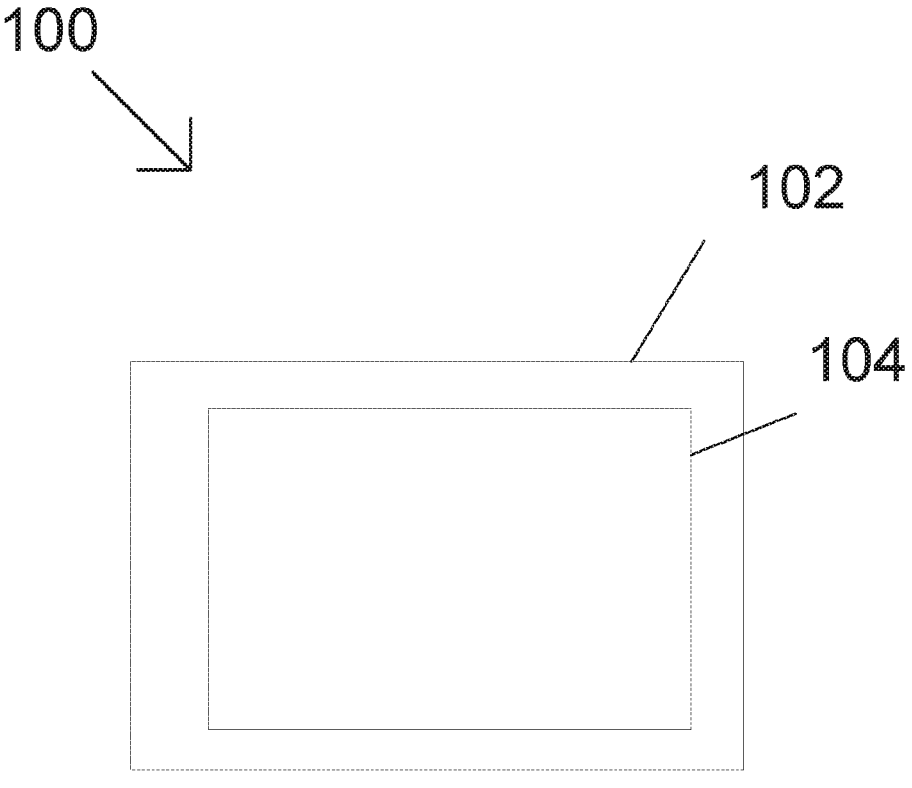

SELF-DECONTAMINATING, SELF-DEODORIZING TEXTILES AND SURFACES AND METHODS OF MAKING AND USING THE SAME

CROSS REFERENCE TO RELATED APPLICATIONS

This application is a U.S. National Stage of PCT Application No. PCT/US2020/048490 filed on Aug. 28, 2020 which is related to, claims priority to, and incorporates herein by reference for all purposes U.S. Provisional Patent Application No. 62/894,018, filed Aug. 30, 2019.

STATEMENT REGARDING FEDERALLY SPONSORED RESEARCH

The invention described herein may be manufactured and used by the U.S. Government for governmental purposes without the payment of any royalty thereon.

BACKGROUND OF THE INVENTION

1. Field of the Invention

The present disclosure generally relates to methods and processes for making substrates (textiles, packaging materials, or rigid or flexible plastic containers) self-decontaminating and/or self-deodorizing by incorporating disinfectant into a stimuli-responsive hydrogel polymer that is functionalized to or associated with the substrate's surface. More particularly, the present disclosure relates to functionalizing or associating substrate surfaces with stimuli-responsive hydrogel polymer that respond to external stimuli by taking up, storing, and controllably releasing chlorine dioxide for the purposes of neutralizing odors, inactivating microorganisms, or preventing cross-reactions with container surfaces. The polymer-functionalized or polymer-associated surfaces are re-chargeable and can be used for single-use or for multiple cycles of use of uptake, storage, and release of chlorine dioxide disinfectant for purposes of self-decontamination and/or self-deodorization.

2. Description of Related Art

There is a critical need for self-decontaminating, self-deodorizing, self-disinfecting, and/or self-cleaning surfaces, particularly for textiles used in individual protective garments to respond to two types of threats: i) communicable diseases and antibiotic-resistant pathogens in hospitals, healthcare, and nursing settings, and ii) chemical and biological warfare agents. In both cases, it is crucial to protect health care professionals providing services, patients, emergency first-responders, deployed military personnel, and others from potential exposure to etiological agents or disease-carrying vectors while carrying out their missions, and to prevent their clothing from acting as a source of spreading further contamination to themselves or anyone else. Without self-decontamination as an inherent feature of the protective garment, disposal of the clothing after brief exposure (30-60 min) to the harmful chemical or biological agent is recommended. In fact, training is required to effectuate the safe donning, doffing, and disposal of protective garments to prevent contamination or re-contamination of the wearer or their surroundings. Additionally, there are unwanted consequences of utilizing such protective garments, which may include hindered mobility, over-heating, and dehydration of the wearer; cross-contamination; and the excessive cost associated with using then disposing these single-use garments. Often, clothing and equipment is treated with autoclaving (wet heat) or bleach (wet or dry hypochlorite) for sterilization and decontamination, but autoclaves are not always readily available or accessible in the field and the use of bleach as the decontaminant is fraught with inherent chemical hazards that impose restrictions on its uses, transportation, storage, and environmentally-safe disposal.

As taught in the prior art, the methods employed in the self-decontamination of textiles, fabrics, and polymeric films and storage containers from microorganisms or harmful chemicals include metal containment, electrochemical cells, inorganic or organic fillers, and chlorine bleach (active ingredient hypochlorite).

Although metal-containing protective systems have the potential to absorb and chemically alter contaminants, artisans familiar with this method of decontamination are aware of and try to avoid some intrinsic problems. First, metal-based decontaminant systems reside in the pores of surfaces attached to fabrics. Because these systems do not discriminate between benign and malignant air-borne particles, they become readily saturated and cannot function unless replaced or reconstituted. Second, the metal-containing systems add significant weight to the clothing to which they are attached. Third, attaching metal-containing systems to fabrics renders the fabrics unbreathable and wearers of clothing made from these fabrics hot, sweaty, and uncomfortable. Fourth, metals in fibers from the fabric could contribute debris that exacerbates injuries, wounds, and infections during explosive or blast events.

The prior art teaches that the best way to overcome these disadvantages, at least to some degree, is with metal-organic-framework (MOF) materials. A typical MOF embodiment contains an acid such as acetylenedicarboxylic acid that forms the framework. A metal such as copper(II) nitrate, and an agent such as pyrazine that links the metal to the organic framework complete the embodiment. An example is afforded by Lee et al. US Patent Application 2013/0123563 A1. This example teaches a high porosity MOF that lessens the tendency to saturate and lightens the weight of the so-treated fabrics. Because such a system may still not function adequately when sophisticated warfare agents or toxic industrial chemicals are encountered, an enzyme may be added to complete the MOF.

Electrochemical self-decontamination of fabrics and textiles depends on incorporating the components of an electrochemical cell onto a fabric such that upon activation an oxidant is generated. Fabrics that have been designed to offer protection from contaminants when woven or assembled into textiles or clothing may be serviceable, if, after exposure, the protective cell can be regenerated. The cell requires electrodes, electrolyte, and precursor to the oxidant. When the electrolyte is a salt, such as sodium chloride, as in Kendig et al. U.S. Pat. No. 9,180,218, atmospheric $O_2$ is reduced to $OH^-$ at the cathode and the anionic portion of the salt is oxidized to the corresponding parent halogen at the anode; in Kendig et al. the parent halogen is dichlorine ($Cl_2$). Because the conditions can be adjusted to include fibers impregnated with water, or the conditions include high humidity, the dichlorine so produced would rapidly hydrolyze to hypochlorous acid, the active component of bleach, which is an effective decontaminant. For the cell to work, connection to a battery or other power source is required. The method, therefore, is not truly one of self-decontamination, because it requires connection to and activation of an internal or external battery or other external source of direct current. Additionally, the fabrics that are constituted so as to act as electrochemical cells are heavy and unwieldy.

Automatic self-decontamination that requires less frequent re-filling than bleach-containing pouches is taught by Rangan et al. (U.S. Pat. No. 9,475,263) by impregnation of a fabric, textile, or cloth with a disinfecting solid-state filler material. The filler material may be, but is not limited to, inorganic fillers, i.e., compounds that can achieve a variety of protective functions. To achieve protection against microorganisms and toxic chemicals, for example, these fillers can be a combination of metal oxides such as zinc oxide with a metallic element such as silver. If, in addition, the fabric is impregnated with a heavy metal such as tungsten or bismuth, the filler protects against electromagnetic radiation. Nonporous gels can also be combined with a base fabric thus conferring an affinity for water to the filler assemblage. Clothing or cloth objects such as tents or sheets that are so fabricated are extremely heavy and prone to saturation.

Household bleach (ca. 6% hypochlorite in aqueous solution) or Super Tropical Bleach (20% hypochlorite as a solid) contain hypochlorite ($OCl^-$ with Cl in the +1 oxidation state) and are conventional external treatments to decontaminate clothing. For the purposes of self-decontaminating garments, Leschinsky (U.S. Pat. No. 9,392,824) teaches the fabrication of garments with numerous pockets that can be filled with bleach or other disinfectant solutions. In such an article of clothing, pockets contain flexible chambers, impermeable unless pressurized, that are filled with the decontaminant solution. Upon compression, the decontaminant fluid flows out, whereupon it can attack pathogens or react with toxic chemical agents. Several such impermeable chambers are connected by a series of tubes which, in turn, are connected to a central tube that allows the chambers to be refilled after use. This method is cumbersome and suffers the same issues of reactivity, corrosivity, and hazardous handling of bleach that compel the need for finding alternative decontamination agents, preferably as self-decontaminating methods.

Chlorine dioxide ($ClO_2$, with the Cl atom in the +4 oxidation state) is a potent alternative to bleach, because chlorine dioxide is effective at low doses, destroys odors, inactivates a broad spectrum of pathogens and spoilage microorganisms (bacterial cells, bacterial spores, yeasts, molds, mildews, and fungal spores, and viruses) without these organisms acquiring resistance, is environmentally-friendly (has low toxicity to humans and the environment), and is non-corrosive with most materials and surfaces. The pulp and paper industry uses large-scale quantities of $ClO_2$ to bleach wood pulp for the production of high-quality white paper products through the reduction of chlorate ($ClO_3^-$, with Cl in the +5 oxidation state) in strong acid solutions by reductants such as sulfur dioxide, methanol, hydrogen peroxide, or hydrochloric acid. While this process is used extensively in the pulp and paper industry, it involves hazardous chemical reagents and reaction processes in electrically-powered equipment that are unsuited for smaller-scale, power-free applications, such as self-decontaminating textiles. The prior art of chlorine dioxide generation particularly relevant to this invention falls into three categories: 1) Acidification of chlorite ($ClO_2^-$, with the Cl atom in the +3 oxidation state), 2) Oxidation of chlorite ion, and 3) Reduction of chlorite ion with the concomitant formation of transient intermediates.

Acidification. Acidifying a neutral aqueous solution of sodium chlorite, for example, produces chlorous acid ($HClO_2$, with the Cl atom in the +3 oxidation state), which disproportionates to produce chlorine dioxide. Creating an acidic solution also creates hazards in that it is difficult to use, apply, and dispose of safely because of the acidity (low pH). The prior art of acidification teaches the intimate mixture of solid reagents in a tablet, pellet, or briquette contained in a water-impermeable packet. Reaction occurs when the packet is opened and the tablet, for example, is added to water (Speronello, et al., U.S. Pat. No. 6,432,322). Other prior art teaches single envelopes, sachets, or pouches containing a mixture of the solid reagents, or sequestration of chlorite salt and acid in two separate envelopes, sachets, or pouches, with the materials used to construct such dispensers commonly consisting of hydrophilic or hydrophobic polymeric sheets or films that can be perforated to admit liquid water and allow gaseous products to escape. Reaction is initiated either by gradual exposure to atmospheric water vapor or by one-time manual exposure to liquid water (Hamilton et al. U.S. Pat. Nos. 6,602,466 and 6,607,696). The prior art also teaches apparatuses with pre-loaded pouches or bags constructed of water soluble membranes, or disposable or renewable cartridges containing solid reagents in which reaction can be initiated by remotely causing pre-stored liquid water to contact the reagents in the pouches or cartridges (Dee et al. U.S. Pat. No. 7,534,398). Those skilled in the art of using such pouches to generate chlorine dioxide have also adapted water soluble paper to sequester the reagents prior to water exposure (Baselli et al. U.S. Pat. No. 9,333,475).

Oxidation of chlorite ion. Attempts to make electrochemical oxidation more suitable for small scale production of chlorine dioxide are taught by Tremblay et al. (U.S. Pat. No. 7,048,842) in the use of a porous anode to effect the electrochemical oxidation of chlorite ion. This method requires power and is highly inefficient. Rosenblatt et al. (U.S. Pat. Nos. 4,504,442 and 4,681,739) use sodium persulfate as oxidant, but this method is quite slow. To adapt dichlorine oxidation of chlorite ion to small scale use, Rosenblatt et al. (U.S. Pat. No. 5,234,678) teach the use of carbon dioxide gas as a diluent, reducing the toxicity of chlorine gas. In aqueous solution containing chloride ion, equilibrium between $Cl_2$ and HOCl occurs very rapidly, and that hypochlorous acid or the hypochlorous anion ($OCl^-$) have the necessary electrochemical potential to oxidize the chlorite ion to chlorine dioxide. The direct addition of hypochlorite solutions, as in a solution of commercial bleach, is possible (Aalves, European Patent Application Number EP 2,962,988), but this method is complex and necessitates multiple additions of citric acid to initiate reaction and of sodium bicarbonate to control pH.

Skilled practitioners in the art of this method of chlorite ion oxidation prefer to use a less direct approach. Several small molecules such as chloramine ($NH_2Cl$), sodium dichloroisocyanurate (sodium 3,5-dichloro-2,4,6-trioxo-1,3, 5-triazinan-1-ide, $C_3Cl_2N_3NaO_3$), and 1,1-dichloro-5,5-dimethylhydantoin ($C_5H_6Cl_2N_2O_2$) hydrolyze to form the hypochlorite ion, and therefore they find use in water disinfection. In the presence of, for example, sodium chlorite, these molecules can be adapted to the purpose of chlorine dioxide generation (e.g., Bender et al., US Patent Application 2016/0058901). Because of the toxicity of the parent compound and the organic byproduct, the recommended levels of safe usage of such compounds is very low; 1 g/L in the case of sodium dichloroisocyanurate, for example (Kuznesof, $61^{st}$ JEFCA, FAO 2004, *Chemical and Technical Assessment*, which is hereby incorporated herein as a reference). The use of such methods for incorporation into clothing, fabrics, and textiles for the purposes of self-disinfection and self-decontamination is counterproductive and impractical.

None of this aforementioned prior art teaches the reduction of chlorite ion by the mixing of dry reagents in water to generate chlorine dioxide nor the use of pre-made chlorine dioxide solutions with rechargeable surfaces for multiple re-uses.

Reduction of chlorite ion and the formation of oxidizing transient intermediates. The most practical small-scale methods of generating chlorine dioxide known to practitioners of the art are the reductions of the chlorite ion ($ClO_2^-$, with the Cl atom in the +3 oxidation state), to produce transient intermediates capable of undergoing subsequent reactions, which include oxidizing the chlorite ion ($ClO_2^-$) to form chlorine dioxide ($ClO_2$, with the Cl atom in the +4 oxidation state). The so-generated chlorine dioxide can be used to inactivate bacterial cells, bacterial spores, yeasts, molds, mildews, and fungal spores, and/or viruses in myriad decontamination or in other applications for which $ClO_2$ is well-suited. A first such invention utilized chlorite as oxidant, disodium sulfite [S(IV)] as reductant, and sodium hydrogen ascorbate as an effector to initiate the production of reactive intermediates that speed up the reaction (Doona et al. U.S. Pat. No. 7,883,640). This novel chemical combination can be used to generate gaseous chlorine dioxide and exothermic heat (Doona et al. U.S. Pat. No. 7,625,533) or to generate aqueous solutions of chlorine dioxide through a 2-step mixing process (Doona et al. U.S. Pat. No. 8,337, 717).

Further innovations in the reduction of chlorite by low-valent sulfur compounds eliminated the need for the effector component, thereby simplifying the system to the mixing of two dry reagents in water in a 1-step process that rapidly, controllably, and non-exothermically produced chlorine dioxide in pH neutral aqueous solutions even at dilute concentrations. Formamidine sulfinic acid (FSA), for example, reacts with chlorite in neutral aqueous solutions to rapidly produce low ($\approx$1 ppm) to high ($\geq$500 ppm) concentrations of aqueous chlorine dioxide solutions through a 1-step mixing process of dry precursors in water (Doona et al. U.S. Pat. No. 9,517,934). As a second example, combining dry hydroxymethanesulfinic acid (HMS) and dry chlorite in water or aqueous solutions to produce aqueous chlorine dioxide solutions at any relevant concentration (Doona et al., U.S. Pat. No. 10,626,016).

In addition, the dry reagents of HMS and chlorite can be configured for use with polymers (e.g., polylactic acid, PLA, or superabsorbent hydrogel) to mix with water in the form of a liquid, aqueous solution, or gaseous vapor and produce chlorine dioxide (Doona et al., US Patent Publication 20200239306 A1). Specifically, the dry reagents can be incorporated into a pad comprising a superabsorbent hydrogel polymer or a stimuli-responsive hydrogel polymer as a humidity-controlled packaging system, such that the absorption of moisture by the pad in humid environments provides water for dissolution of the dry reagents that induces chemical reaction and the time-released production of low levels of chlorine dioxide gas. This humidity-controlled, time-released system could be used to package fresh fruit, produce, or other respiring tissue that generate humidity in-packaging and thereby triggers the chemically-impregnated superabsorbent hydrogel polymer pad to generate low-levels of chlorine dioxide disinfectant that will prevent mold growth and inactivate other spoilage or pathogenic micro-organisms (Doona et al., U.S. Pat. No. 10,626,016). Similarly, stimuli-responsive hydrogel polymers impregnated with dry HMS and dry chlorite in spatially separated regions of the hydrogel can be induced by specific stimuli to take up water and allow the reaction of HMS and chlorite to occur and produce chlorine dioxide. Additionally, stimuli-responsive hydrogel polymers can be induced to release water and provide a source of water for mixing dry HMS and dry chlorite external to the hydrogel matrix and produce chlorine dioxide (Doona et al., US Patent Publication 20200239306 A1).

While this prior art teaches useful methods for generating chlorine dioxide through the reduction of chlorite ion in aqueous solvents, none of these systems teach the use of pre-made chlorine dioxide aqueous solutions with stimuli-responsive hydrogel polymers alone, associated with, or functionalized to surfaces to create re-chargeable surfaces for purposes of multiple cycles of decontamination, deodorization, or other applications.

In view of the deficiencies of the above prior art, there is a current need for a method of making the surfaces of textiles, fabrics, polymeric films, and plastic storage containers to be self-decontaminating and/or self-deodorizing by functionalizing or associating the surfaces with stimuli-responsive hydrogel polymers that take up and store aqueous disinfectant solution, then controllably release and deliver aqueous or gaseous disinfectant to the surfaces and their surroundings and are re-chargeable for single- and multi-use purposes of self-decontamination or self-deodorization and other applications.

SUMMARY OF THE INVENTION

According to one aspect, an article can comprise a substrate having a stimuli-responsive hydrogel polymer functionalized to a surface. The stimuli-responsive hydrogel polymer can be at least partially hydrated by an aqueous disinfectant solution comprising a disinfectant. The disinfectant can be formed prior to hydrating the stimuli-responsive hydrogel polymer. At least a portion of the disinfectant can be taken up, stored, or released as an aqueous solution or a gaseous vapor upon interaction with a stimulus. The article can be self-deodorizing, self-cleaning, self-decontaminating, self-protecting, self-stabilizing, or a combination thereof by virtue of the stimuli-responsive hydrogel polymer.

The substrate can be or can form part of a textile, a fabric, an article of clothing, a packaging material, a polymeric film, a container, or a combination thereof. The textile, the fabric, the article of clothing, or a combination thereof can be woven, knitted, or non-woven. The textile, the fabric, the article of clothing, or a combination thereof can also comprise natural fibers including cotton or wool and synthetic fibers. The synthetic fibers can comprise polyester, nylon, rayon, dacron, or a combination thereof. The substrate can be or can form part of the packaging material. The packaging material can be a packaging film comprising polyethylene-terephtalate, polylactic acid, polyhydroxyalkanoate, cellulose, starch, gelatin, polyethylene, polystyrene, or a combination thereof. The substrate can be or can form part of the container. The container can be formed from a rigid or flexible plastic. The container can also be formed from polyethyleneterephthalate, polystyrene, polypropylene, or a combination thereof. The container stores, transports, or dispenses a cleaning solution that undergoes degradation by cross-reaction with an inner surface of the container.

The stimuli-responsive hydrogel polymer functionalized to a surface can be re-chargeable and capable of uptaking, storing, and controllably releasing aqueous solution containing disinfectant over multiple cycles. The stimuli-responsive hydrogel polymer functionalized to a surface can be a thermoresponsive hydrogel polymer, with the stimulus being a change (increase or decrease) in temperature. The stimuli-responsive hydrogel polymer can comprise a derivative of N-isopropylacrylamide. The derivative of N-isopropylacrylamide can be selected from the group consisting of poly-{N-isopropylacrylamide}, poly-{N-isopropylacrylamide-co-chitosan}, poly-{N-isopropylacrylamide-co-acrylic acid}, and combinations thereof. The thermoresponsive hydrogel polymer can have a lower critical solubility temperature (LCST) of between 20° C. and 40° C. The disinfectant can be present in an amount suitable to release the disinfectant, preferably in an amount of between 1 ppm and 1000 ppm.

According to another aspect, a method of using a stimuli-responsive hydrogel polymer functionalized to a surface that can be at least partially hydrated by water or an aqueous solution is disclosed. The aqueous solution can comprise a disinfectant. The disinfectant can be chlorine dioxide. The aqueous solution of chlorine dioxide can be made by acidification, oxidation, reduction, or any other method for producing aqueous chlorine dioxide solution. In certain cases, the aqueous solution of chlorine dioxide is produced by the reduction of a stoichiometric excess of chlorite by HMS or by the reduction of a stoichiometric excess of chlorite by 2-Amino-3-sulfhydrylpropanoic acid (the amino acid Cysteine). The method can comprise providing a stimulus to the stimuli-responsive hydrogel polymer. The method can thereby include controllably uptaking, storing, or releasing at least a portion of the aqueous disinfectant solution. The aqueous solution, which can include chlorine dioxide, eliminates odors or inactivated microorganisms including bacterial cells, bacterial spores of the *Bacillus* and *Clostridia* genera, yeasts, molds, mildews, fungal spores, and viruses.

According to another aspect, a sachet can comprise the article consisting of the stimuli-responsive hydrogel polymer or the stimuli-responsive hydrogel polymer functionalized to or associated with one of its surfaces. The sachet can also be optionally reinforced with a non-woven backing material. The sachet can be configured to be added as a wearable or non-wearable insert to clothing, outerwear, or footwear that releases disinfectant at a rate proportional to the ambient temperature and humidity. The sachet can also be configured as an insertable/removable sachet to be used inside a container, an enclosure, or a combination thereof, such that the container or the enclosure can be adapted to hold a contaminated item and the sachet can release disinfectant for purposes of decontaminating objects inside the container or enclosure, or a combination thereof. The foregoing and other aspects and advantages of the invention will become apparent through the following description.

BRIEF DESCRIPTION OF THE DRAWINGS

FIG. 1 is an article in accordance with aspects of the present disclosure.

DETAILED DESCRIPTION OF THE INVENTION

The present disclosure generally relates to methods and/or processes for making textiles, fabrics, packaging films or materials, or rigid or flexible plastic containers self-decontaminating, self-deodorizing, self-disinfecting, self-cleaning, self-protecting, and/or self-stabilizing by functionalizing or associating the surfaces of the textiles or fabrics, packaging materials or polymer films, or rigid or flexible plastic containers with a stimuli-responsive hydrogel polymer capable of taking up, storing, and controllably releasing disinfectant (preferably chlorine dioxide) as an aqueous solution or a gaseous vapor. The method can further include re-charging the hydrogel polymer-functionalized surface with fresh disinfectant such that the article can be single-use or it can be re-charged with chlorine dioxide via a method to include a second appropriate stimulus, and this process can be repeated for hundreds of cycles of re-use for taking up, storing, and controllably releasing chlorine dioxide disinfectant over many cycles of use in any applications in which $ClO_2$ is effective, such as the environmentally-friendly decontamination of a broad spectrum of pathogens and spoilage microorganisms (bacterial cells, bacterial spores, yeasts, molds, mildews, and fungal spores, and viruses) or the elimination of odors. The use of stimuli-responsive hydrogel polymers functionalized or associated with surfaces to controllably take up and release pre-made aqueous chlorine dioxide disinfectant solution is new and offers advantages, which include but are not limited to, i) eliminating the need for a chemical reaction step, and ii) the use of stimuli-responsive hydrogel polymers allows the functionalized or associated surface to be single-use or re-chargeable for multiple cycles of re-uses of chlorine dioxide controlled release.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, a hydrogel refers to a 3-D network of polymer chains that are usually made of hydrophilic natural or synthetic polymers with covalent bonds, hydrogen bonds, ionic bonds, and hydrophobic interactions connecting the polymer chains together. Hydrogels, such as cellulose acetate for example, are superabsorbent materials that can absorb water in their 3-D networks and swell, but can also remain insoluble in water. The hydrogel may be a stimuli-responsive hydrogel, also called a smart material. As used herein, a stimuli-responsive hydrogel or smart material refers to a hydrogel polymeric network that is capable of undergoing reversible changes in properties in response to changes in environmental stimulus, such as changes in stimuli relating to solvent composition, temperature, pH, electricity, magnetic field, moisture/water, light, and/or electromagnetic radiation. A thermoresponsive hydrogel polymer, for example, when immersed in water may swell and take up water at lower temperatures and contract and release water at higher temperatures. These processes are reversible and may be repeated over many cycles of temperature change without damaging the hydrogel polymer's fundamental structure.

As used herein, "hydrated" or "has been hydrated" or "having been hydrated" or variations thereof when used in the context of a hydrogel refers to the hydrogel's uptaking an aqueous composition within its crystalline structure. This hydration stands in contrast to other kinds of water uptake, such as the filling of pores within a structure or other absorptions/adsorptions that do not involve disruption or incorporation within the crystalline structure of the hydrogel. When hydration occurs in the context of a hydrogel, one or more intermolecular bonds are interrupted by a component of the aqueous solution that is hydrating the hydrogel. The taking up of water by the hydrogel polymer's network is often referred to as the water binding capacity or water retention capacity of the hydrogel polymer. In the present disclosure, the stimuli-responsive hydrogel polymer is at least partially hydrated by water or an aqueous disinfectant solution comprising a disinfectant. It is understood that water is the solvent and the disinfectant is the solute in the aqueous solution. The disinfectant is formed prior to hydrating the stimuli-responsive hydrogel polymer with the aqueous disinfectant solution (i.e., the disinfectant is not present in the form of precursors that need to subsequently react to form the disinfectant). At least a portion of the disinfectant is released as an aqueous solution or a gaseous vapor upon interaction with an external stimulus.

Referring to FIG. 1, an article 100 is illustrated in accordance with an aspect of the present disclosure. The article 100 includes a substrate 102 and a stimuli-responsive hydrogel polymer 104 functionalized to or associated with the surface of the article 100. The stimuli-responsive hydrogel polymer 104 is at least partially hydrated by an aqueous disinfectant solution comprising a disinfectant. At least a portion of the disinfectant is released to its surrounding environment as an aqueous solution or a gaseous vapor upon interaction with a stimulus. By virtue of the action of the stimuli-responsive hydrogel polymer and the uptake, storage, and controlled release of the disinfectant, the article is made re-chargeable for any number of repeat uses for the purposes of being self-decontaminating, self-deodorizing, self-cleaning, self-protecting, self-stabilizing, or a combination thereof.

While FIG. 1 shows an article 100 where the stimuli-responsive hydrogel polymer 104 is functionalized to fully surround the exterior of the substrate 102, it is also contemplated that the stimuli-responsive hydrogel polymer 104 can be functionalized to or associated with only a portion of an external surface of the substrate 102. In some cases, the stimuli-responsive hydrogel polymer 104 can be functionalized or associated with the surface to fully encapsulate the substrate 102. In some cases, the functionalized stimuli-responsive hydrogel polymer 104 is located on one side of the substrate 102 and is absent from the opposite side of the substrate 102.

The substrate 102 is or forms part of a textile, a fabric, an article of clothing, a packaging material, a container, an insertable pad, or a combination thereof. The substrate 102 may be selected from the group consisting of a woven textile, knitted textile, non-woven textile, leather, polymeric plastic material, a metallic material, a ceramic material, a wooden material, a paper material, a crystalline material, and combinations thereof.

In cases where the substrate 102 is or forms part of a textile, a fabric, an article of clothing, or an insertable pad, the textile, the fabric, the article of clothing, or the insertable pad can be made of woven, knitted, or non-woven textiles, fabrics, or clothing that are made of natural (e.g., cotton, wool) and/or synthetic fibers (e.g., polyester, nylon, dacron, etc.), blends of these types of fibers, spun yarns (cotton, cotton/polyester, abbreviated PES), textured yarns (e.g., PES), or greige. The substrate 102 may comprise at least a portion of a sanitary garment, a shelter, a clothing or accessory item, a hat, a helmet, a uniform, a footwear item made of natural (e.g., leather) or synthetic materials, a piece of wearable protective equipment, or a combination thereof. For wearable items, the disinfectant release may reduce incidences of odors, rashes, irritations, and infections that occur when uniforms/clothing are worn without access to laundries or showers for prolonged periods.

In cases where the substrate 102 is or forms part of a packaging material, the packaging material can be made of plastics, wood, or paper and used for foods, clothing or accessories, footwear, commodities, or other items that undergo microbial degradation (e.g., mold, mildew) during storage. Polymeric plastic packaging materials or films can comprise polymers commonly used in industrial packaging such as polyethylene or polyethyleneterephthalate, in petroleum-based plastics such as polypropylene, polyvinylchloride, or polystyrene, or in bio-degradable films obtained from bio-polymers, such as bio-derived monomers (polylactic acid) or films from bio-mass (cellulose, starch, gelatin) or microbes (polyhydroxyalkanoate), any other polymer commonly used in packaging, or any combination thereof.

In cases where the substrate 102 is or forms part of a container, the container can be formed from a rigid or flexible plastic. In some cases, the container comprises poly ethyleneterephthalate, polystyrene, polyethylene, polypropylene, or a combination thereof. In some cases, the container stores, transports, or dispenses a cleaning composition that undergoes degradation by cross-reaction with an inner surface of the container.

The stimuli-responsive hydrogel of the present invention may comprise a thermoresponsive hydrogel of at least one of poly-{N-isopropylacrylamide}, poly-{N-isopropylacrylamide-co-chitosan}, or poly-{N-isopropylacrylamide-co-acrylic acid} or a combination thereof. Thermoresponsive hydrogel polymers are known to absorb water at temperatures below their lower critical solubility temperature (LCST) and release water at temperatures above their LCST. Results are presented herein that demonstrate the thermoresponsive behaviors of stimuli-responsive hydrogel polymers comprising {poly-N-isopropylacrylamide-co-chitosan, LCST≈29.2° C.} and {poly-N-isopropylacrylamide-co-Acrylic acid, LCST≈31.8-33.3° C.}. Specifically, these stimuli-responsive hydrogel polymers will be demonstrated below to absorb water or aqueous solutions containing disinfectant at temperatures below their respective LCST, and to release water or aqueous solutions containing disinfectant at temperatures above their respective LCSTs, noting that the {poly-N-isopropylacrylamide-co-Acrylic acid} hydrogel polymer preparation showed a more rigid structure than did its {poly-N-isopropylacrylamide-co-chitosan} microgel counterpart.

The stimulus provided to the stimuli-responsive hydrogel polymer can be provided intentionally or can be a response to environmental conditions. By effectuating or controlling the external stimulus (e.g., temperature, pH, redox potential), the hydrogel polymer can be induced to absorb exogenous water or to release bound water or aqueous solution and the disinfectant that is contained therein. As an example of the latter, a heating element can be placed near the stimuli-responsive hydrogel polymer to initiate a rise in temperature above the LCST and intended to release a predetermined amount of the disinfectant. As an example of the former, the stimuli-responsive hydrogel polymer can be placed in a cold weather environment or inside a refrigerator and induced to absorb water or aqueous solution containing disinfectant due to the temperature decline occurring below the LCST. In clothing or garments, the stimuli-responsive hydrogel polymer could be designed to be in communication with a permeable non-woven layer near the person and with a wicking layer away from the person. As an individual's body temperature rises through activities such as exercising, marching, or shoveling snow in cold weather, excess moisture would be whisked away from the body by the wicking layer. As the body cooled after exercising, the stimuli-responsive hydrogel polymer could absorb excess moisture (e.g., sweat). The stimuli-responsive hydrogel polymer layer could initiate the release of disinfectant to self-decontaminate microorganisms that cause rashes, irritations, or infections on the wearer and/or to self-deodorize the garment from sweat, body odors, or by-products of microbial metabolism.

The disinfectant can be chlorine dioxide. Chlorine dioxide is especially well-suited for this purpose, because of its solubility in water, its efficacy at low doses, its activity against a broad spectrum of pathogenic, non-pathogenic, and spoilage microorganisms (bacterial cells and spores, viruses, fungal spores, etc.) without acquiring resistance, its low toxicity to humans and the environment, and its non-corrosive action on most materials and surfaces, including clothing and footwear. Chlorine dioxide generated in aqueous solution by any method is potentially suited for use in the present invention. For example, *Clostridiodes difficile* is a notorious opportunistic pathogen in hospital and nursing care settings that is a public health threat, having caused over half a million cases and 29,000 deaths in the United States in 2011 (in Lessa et al. New England Journal of Medicine. 2015 Feb. 26; 372(9):825-34). Eliminating *C. difficile* spores from surfaces, objects, foods, etc. would likely reduce the incidence of illness from *C. difficile* infection and its corresponding expense. Accordingly, a 25 ppm aqueous solution of $ClO_2$, whether produced by combining chlorite with HMS in water or by combining chlorite with 2-Amino-3-sulfhydrylpropanoic acid (the amino acid Cysteine) in water, inactivated 6-logs of spores of the *C. difficile* wild-type 630Δerm strain equally well, thereby demonstrating that it is the action of $ClO_2$ rather than its method of production that are responsible for decontaminating the microorganisms.

In recent years, studies have showcased that $ClO_2$ is effective in inactivating viruses such as hepatitis A virus and human norovirus. For example, in 2018, Kingsley et al. (Int J Food Microbiol. 2018 May 20; 273:28-32) demonstrated that $ClO_2$ inactivated Tulane virus by monitoring the virus population after exposure of the virus to $ClO_2$ for 30 to 330 min. Tulane virus was used as a surrogate for norovirus, which is often associated with outbreaks of acute gastroenteritis on cruise ships. Kingsley et al. observed non-detectable levels (>3.3 logs reductions) of Tulane virus after 180-minute exposure to $ClO_2$, which was generated in situ from a mixture of 1 mg of sodium chlorite and 1 mL of 10% HCl. The success of $ClO_2$ in viral inactivation (hepatitis A and norovirus in particular) has prompted researchers to study its efficacy in inactivating other virus families, with coronavirus becoming a particular area of interest. Since the first outbreak of COVID-19 (coronavirus disease of 2019) in December 2019 in Wuhan, China, the ongoing pandemic has not only posed health risks to people with underlying health conditions but also caused global disruption in the area of economy, education, food production, transportation, etc. The study of the inactivation of coronavirus (more specifically, severe acute respiratory syndrome coronavirus 2 or SARS-CoV-2, the causative virus of COVID-19) on contaminated surfaces by $ClO_2$ could therefore offer promising possibilities of eliminating the virus on surfaces or airborne and controlling the spread of this disease. For the sake of safety, ease-of-handling, low-cost, and convenience, the relevant prior art methods teaching the small-scale, niche production of chlorine dioxide in situ by the reduction of chlorite are the preferred methods for producing aqueous chlorine dioxide solutions to charge and re-charge the surfaces of textiles or fabrics, packaging materials or film, or rigid or flexible plastic containers functionalized or associated with a stimuli-responsive hydrogel polymer.

There are many applications and needs for improved self-deodorizing, self-cleaning, self-disinfecting, self-decontaminating, or self-stabilizing textiles that this present invention addresses. Textiles that are woven, knitted, or non-woven and made of natural (e.g., cotton, wool), synthetic (e.g., polyester, PES, which is made of polyethylene terephthalate, PET), and/or blends of fibers that are commonly used in clothing, uniforms, undergarments, sports and performance apparel, sportswear, hunting garments, hospital uniforms, jumpsuits such as flightsuits worn by aircraft pilots or racing drivers, coveralls worn by fuel handlers, auto mechanics, or for fishing; outerwear such as coats, jackets, parkas, and trenchcoats and raincoats; socks, footwear such as shoes, boots, sneakers, running shoes, and wading boots for fishing; headwear such as helmets, caps, hats, and other head cover; parachutes, sleeves, and kit bags; tents and shelters; and military gear, sports equipment, gear used for hunting or camping (e.g., sleeping bags or rubber liners for kayaks and boats); ruck sacks, backpacks, and gym bags; medical dressings; curtains and drapes; napery; blankets; upholstery; mats, rugs, carpets, and other durable floor coverings used in commercial, household, residential, or hospitality settings or in automobiles and other land vehicles, and airplanes and helicopters; and. The stimuli-responsive hydrogel polymer can also be formed on a reinforcing non-woven layer for use as insertable pads in the armpits or groins of jumpsuits; in overcoats and parkas; in sleeping bags, sports bags, or other enclosed spaces; or in boots, athletic shoes, and other footwear.

The controlled-release of chlorine dioxide by a re-chargeable stimuli-responsive hydrogel functionalized to or associated with surfaces as taught in the present invention is especially useful in circumstances when the clothing, packaging, containers, equipment, vehicles, or materiel is deployed or stored in humid, warm conditions (e.g., tropical environments) that induce the growth of microbes that produce malodorous gases, microorganisms such as molds that deteriorate textiles and materiel, or pathogenic micro-organisms that cause dermal or sub-dermal irritations, particularly with clothing worn for prolonged durations without access to showers, bathrooms, and laundering.

In some cases, the article 100 can be incorporated into a re-usable wearable/insertable/removable pad or sachet that decontaminates, deodorizes, or disinfects separate items. For example, the re-usable wearable/insertable/removal pad could be a non-woven substrate functionalized or associated with a stimuli-responsive hydrogel polymer capable of being re-charged with chlorine dioxide disinfectant. The wearable pad can be added to parkas, trench coats, flight suits, jackets, and boots and footwear, etc. that are not easy to wash and keep clean. Similarly, an insertable pad could be place inside sleeping bags or tents during storage, gym bags, backpacks, luggage to remove odors and microbes or inside. Additionally, a re-usable sachet can be used with an enclosure that encompasses at least one item to be decontaminated. For example, the sachet can be used to decontaminate fruits, vegetables, fresh produce, flowers, plants, textiles, uniforms, shoes, equipment, blankets, mats, tents, etc. that are susceptible to degradation through the growth of molds or spoilage organisms, or that can transmit disease vectors, such as foodborne pathogens. Further, the re-usable sachet can be used in the enclosed space of a structured container that holds chemically or biologically contaminated objects. In that case, the stimuli-responsive hydrogel polymer may be integrated with the interior surface of the container and gaseous disinfectant (e.g., chlorine dioxide) can emerge from the hydrogel gradually and permeate the interior of the structured container to effectuate chemical or microbial decontamination of the container's interior or the surfaces of objects contained therein, Finally, functionalizing the interior surface of containers that hold chemicals, cleaning supplies, or other janitorial cleaners can prevent degradation of the active ingredients that otherwise may occur thought cross-reaction with functional groups on the container's surface.

In the methods discussed above to decontaminate an item or a plurality of items in a container, an enclosure, or in a combination thereof, the decontamination method can include the disinfectant release described above and further comprise contacting the item with the chlorine dioxide produced using the above method. In this method of decontamination, the stimulus can be provided to release the disinfectant in situ, at will, and on-site at controlled rates. In this manner, the chlorine dioxide may be generated at any conceivable concentration for safe use in any desired biological or chemical decontamination application.

The present invention relates to methods of functionalizing textiles, fabrics, clothing, polymeric films, packaging, or storage containers with a stimuli responsive hydrogel polymer that uptakes and controllably releases chlorine dioxide molecules for single-use or repeatedly over multiple cycles for the primary purposes of achieving self-decontamination, self-deodorization, self-disinfection, self-cleaning, and self-protection of the functionalized material and its immediate surroundings. The present invention also relates to the decontamination of an item or of a plurality of items, with the decontamination method including the disinfectant release as described above. The prior art of films and fabrics related to decontamination and self-protection is directed to deliberate assaults and thereby distinguishes itself from the present invention. In contradistinction, the present invention relates to deliberate assaults, as mentioned above, and the present invention relates to environmental assaults from adventitious chemicals or microorganisms that can render clothing, fabrics, and draperies useless by the production of noxious odors or by changes in physical appearance such as those that accompany contamination and staining by mold, mildew, or dry rot. Prevention and remediation of these molecular or microbial assaults constitutes the self-deodorization, self-cleaning, self-disinfection, self-decontamination, self-protection, and/or self-stabilization process of the present invention.

EXAMPLES

Example 1—demonstration of reversible thermoresponsive behavior of first hydrogel. The hydrogel polymer{poly-N-isopropylacrylamide-co-chitosan} was synthesized and a sample was dried overnight in a vacuum oven at 40° C., which produced a dry hydrogel sample weighing 244.5 mg. Immersing this sample in excess water and storing it for 30 min in a refrigerator (4° C.) led to the weight of the sample increasing to 848.4 mg from the uptake of water. Moving that same sample to a dry Petri plate and storing it at T=55° C. for 30 minutes induced the loss of water from the hydrogel, and the weight of the hydrogel correspondingly decreased to 266.3 mg.

The weight of two different additional samples of the stimuli-responsive hydrogel polymer {poly-N-isopropylacrylamide-co-chitosan} were determined after a series of temperature changes between T=4° C. and T=55° C. to demonstrate their thermoresponsive character and behavior (Table 1).

TABLE 1

Increased weight gain of water or aqueous saline by the thermoresponsive hydrogel {poly-N-isopropylacrylamide-co-chitosan}

| | Sample 1 | Sample 2 |
|---|---|---|
| In water at T = 55° C. | 222.9 mg | 7.5 g |
| In water at T = 4° C. | 350.8 mg | 11.9 g |
| In water + NaCl at T = 4° C. | 357 mg | 12.8 g |

Example 2—demonstration of reversible thermoresponsive behavior of second hydrogel. The hydrogel polymer{poly-N-isopropylacrylamide-co-Acrylic acid} (abbreviated NiPAAM-Am with an LCST≈31.8-33.3° C.} was synthesized and a sample was dried overnight at 55° C. and weighed 84 mg. Storing that same sample immersed in excess water at room temperature for 1.5 hours increased the weight to 435 mg due to the uptake of water. To further demonstrate this point, a sample of the NiPAAM-Am hydrogel polymer was stored at T=55° C. and reached a dry weight of 1326 mg. The same sample of NiPAAM-Am was placed in a vessel with excess water and stored at T=4° C. for 60 min, and the sample's weight increased to 3082 mg. These results above demonstrate the thermoresponsive properties of the stimuli responsive hydrogel polymer samples in terms of absorbing water at temperatures below the LCST and releasing water at temperatures above the LCST.

The following results are examples to demonstrate the abilities of these same thermoresponsive hydrogel polymers [{poly-N-isopropylacrylamide-co-chitosan} and {poly-N-isopropylacrylamide-co-Acrylic acid}] to take up and release aqueous solutions of chlorine dioxide at the same respective temperatures, which were chosen to be significantly below or above their intrinsic LCST values. Before carrying out these tests, the thermoresponsive polymers were induced to take up chlorine dioxide solution (T=4° C.) followed by exposure at T=55° C. to expel liquid from the polymer network for several cycles, to pre-condition the hydrogels and help remove impurities from the hydrogel polymer network that may cross-react with the chlorine dioxide. After 3-4 cycles, chlorine dioxide was detected in the expelled solution, as demonstrated by its visual yellow color, its bleach-like odor, and by independent verification using $ClO_2$-specific indicator test strips (High range of 0-500 ppm or Low range of 0-10 ppm, Selective Micro Technologies, Beverly, MA). As this process was repeated for multiple cycles with the aforementioned stimuli-responsive hydrogel polymers independently, there were no observed limits to the number of times this process could be repeated, such that the present invention is re-chargeable and can be used for multiple cycles of disinfectant uptake, storage, and controlled release. Further, the stimuli-responsive hydrogel polymers can take up any concentration of aqueous chlorine dioxide (preferably 0-500 ppm or more), then release it in a time-controlled manner as either an aqueous solution (see Examples 4-6 below) or as gaseous chlorine dioxide (see Examples 7-8 below) at any concentration and at a rate dependent on the ambient temperature, humidity, and pressure.

Example 3: A sample of pre-conditioned dried {poly-N-isopropylacrylamide-co-chitosan} hydrogel was stored in a covered vessel with excess aqueous chlorine dioxide solution at T=4° C. overnight. In these conditions, the hydrogel became swollen and bloated with aqueous chlorine dioxide solution. The bloated hydrogel sample was removed from the vessel, rinsed with distilled deionized water, then placed in a clean beaker containing fresh distilled deionized water at T=25° C. Chlorine dioxide exited the sample and entered the surrounding water. The chlorine dioxide concentration of the surrounding water increased from 0-50 ppm chlorine dioxide over the course of 1 hour, as tested with a chlorine dioxide indicator strip.

Example 4. A separate sample of the {poly-N-isopropylacrylamide-co-chitosan} hydrogel was stored in a covered vessel with excess aqueous chlorine dioxide solution at T=4° C. overnight. The sample was removed from the vessel, rinsed with distilled deionized water, and then placed in a covered clean vessel containing pure water at room temperature for 1 h. After 1 hour, the surrounding solution became >100 ppm chlorine dioxide, as tested with a chlorine dioxide indicator test strip.

Example 5. A separate sample of pre-conditioned dried {poly-N-isopropylacrylamide-co-Acrylic acid} hydrogel was placed in a covered vessel with excess aqueous chlorine dioxide solution and stored overnight at T=4° C. The hydrogel sample was removed from the vessel, rinsed with distilled deionized water, and then placed in a clean vessel with 500 mL of pure water at room temp for 30 min. The surrounding water increased to >100 ppm chlorine dioxide, as shown with an indicator test strip.

Example 6—results demonstrating measurements of gaseous chlorine dioxide emanated by the stimuli-responsive hydrogel polymer in a closed container. A sample of {poly-N-isopropylacrylamide-co-Acrylic acid} hydrogel polymer was placed in a covered vessel with excess aqueous chlorine dioxide solution at T=4° C., and the sample picked up the aqueous chlorine dioxide solution. The sample was moved to a dry, clean vessel and placed in an oven at T=55° C. to expel fluid from the sample, and the expelled chlorine dioxide solution was discarded. The sample was returned to a covered vessel containing aqueous chlorine dioxide solution and stored in a refrigerator at T=4° C. to absorb aqueous chlorine dioxide solution again. The hydrogel cube samples was removed, rinsed with distilled water, and placed inside a clean, empty beaker that was covered with Parafilm and with a chlorine dioxide test indicator strip taped to the underside of the Parafilm cover. The set-up was stored at room temperature, and gaseous chlorine dioxide off-gassed from the hydrogel sample into the covered beaker, and the chlorine dioxide test indicator strip turned dark green (>500 ppm) in 2 minutes.

In Examples 7-10 presented below, the thermoresponsive hydrogel polymers {poly-N-isopropylacrylamide-co-chitosan} and {poly-N-isopropylacrylamide-co-Acrylic acid} were chemically bonded onto polyester fabric used in military clothing to demonstrate the present invention for self-deodorizing, self-cleaning, self-disinfecting, self-decontaminating, self-protecting, and/or self-stabilizing textiles used as fabrics for clothing. PES was the chosen fabric material, because it is made of polyethylene terephthalate, abbreviated PET. PET is the most common thermoplastic polymer resin of the polyester family and it consists of polymerized units of the monomer ethylene terephthalate, with repeating $(C_{10}H_8O_4)$ units. Pellets of PET are heated to a molten liquid that is easily extruded or molded into any shape, such as fibers used in clothing, containers for liquids and foods, thermoforming for manufacturing, and in combination with glass fiber for engineering resins. In the context of textile applications, PET is referred to by its common name of polyester (PES), whereas the acronym PET is generally used in relation to packaging containers for liquids and foods. Demonstrating the present invention is therefore done with PES fabrics used in military clothing, a textile application, and these results are representative of how the present invention would work with other functionalized textiles or with PET in other forms used for packaging, containers, or engineered resins.

Samples of the thermoresponsive hydrogel polymers {poly-N-isopropylacrylamide-co-chitosan} and {N-isopropylacrylamide-co-Acrylic acid} were functionalized onto PES using the following procedure. Approx. 2"×3" coupons made of the PES used as base materials in military textiles for uniforms, undergarments, and other applications were saturated by dropwise additions of an aqueous solution containing 90% ethanol and 4-5% wt benzophenone. Chilled samples of the hydrogel polymer were crushed into small particulates and smeared onto the wet fabric samples using a metal spatula to create a thin layer of polymer over the entire fabric sample. The samples were placed under UV light (Mineralight Lamp, Model UVGL-58, multiband UV-254/366 nm) for 60-90 minutes to induce bonding between the hydrogel polymer and the fabric sample. Other methods could be used to covalently bond the stimuli-responsive hydrogel polymer to the fabric surface, such as atomic or chemical vapor deposition methods that coat the fabrics with polymers containing functional groups accessible to bond the thermoresponsive hydrogel polymer. In all cases, the treatments yield an equivalent end-result of a surface functionalized with the stimuli-responsive hydrogel polymers of interest.

The thermoresponsive hydrogel polymer {poly-N-isopropylacrylamide-co-Acrylic acid} showed better adhesion to the fabric than did the {poly-N-isopropylacrylamide-co-chitosan} microgel. Individual fabric samples functionalized with either one of these thermoresponsive hydrogel polymers were dried at T=55° C., and in both instances the particulates lost water and shrank. When the functionalized fabrics samples with either hydrogel polymer were wetted with water and cooled to T=4° C., the polymer particles swelled with water and the bloated polymer covered the fabric samples more completely. This process worked repeatedly and reproducibly over several cycles and held up when the samples were inverted, demonstrating that the hydrogel polymers were coordinated to the fabric surfaces and were re-chargeable for multiple uses.

Example 7: The PES fabric samples functionalized with {poly-N-isopropylacrylamide-co-chitosan} or {poly-N-iso-propylacrylamide-co-Acrylic acid} were stored at T=4, 37, or 55° C. for several cycles of aqueous chlorine dioxide solution uptake and discharge, to pre-condition the hydro-gels and clean out any impurities from the polymer network. Approximately 15 drops of aqueous chlorine dioxide solu-tion were added to each functionalized PES fabric sample, and the samples were stored at T=4° C. or T=55° C. in a covered glass Petri dish with a chlorine dioxide indicator strip taped to the interior underside of the Parafilm cover. In both cases ({poly-N-isopropylacrylamide-co-chitosan} or {poly-N-isopropylacrylamide-co-Acrylic acid}), the indica-tor changed color commensurate with approx. 500 ppm of chlorine dioxide being off-gassed.

Example 8: Approximately 3-4 drops of aqueous chlorine dioxide solution were put onto each hydrogel-functionalized PES sample and on a separate sample of unfunctionalized PES. Each of the three (3) samples were placed in separate glass Petri dishes with a chlorine dioxide indicator taped to the underside of the Parafilm cover, and stored at room temperature. The chlorine dioxide indicators for each of the hydrogel-functionalized PES samples turned dark green within 10 minutes, indicative of 100-250 ppm chlorine dioxide being off-gassed. At 45 minutes, the indicator colors darkened and were commensurate with approx. 500 ppm chlorine dioxide. In contradistinction, the unfunctionalized PES sample's indicator was pale green when examined at 10 minutes (approx. 10 ppm chlorine dioxide) and when exam-ined again as 45 minutes (pale green color is approx. 10 ppm chlorine dioxide). A *Bacillus stearothermophilus* (BT) spore indicator was placed in in the covered Petri dishes for the uncoated PES fabric and the PES sample functionalized with {poly-N-isopropylacrylamide-co-Acrylic acid} for 48 h, then removed and incubated. The BT strips showed micro-bial survival for the uncoated PES sample, but indicated inactivation for indicator placed coincident with the {poly-N-isopropylacrylamide-co-Acrylic acid}-functionalized PES samples.

Example 9: Adding 15 drops of aqueous chlorine dioxide solution directly to untreated woven nylon ripstop base fabric used for military protective clothing (not functional-ized with a stimuli-responsive hydrogel polymer coating), then the sample was placed in a covered glass Petri dish with a chlorine dioxide test strip taped to the interior underside of the cover and stored at either T=4° C. or T=55° C. Neither sample revealed any chlorine dioxide disinfectant being off-gassed. It is possible that the chlorine dioxide was bound too tightly to the fabric, or the chlorine dioxide reacted with functional groups on the fibers or agents used to treat or finish the fabric during manufacture. These results indicate that functionalizing the stimuli-responsive hydrogel poly-mer to the fabric surface imparts the fabric with additional functionality that can translate into being self-deodorizing, self-cleaning, self-disinfecting, self-decontaminating, self-protective, and/or self-stabilizing when chlorine dioxide is taken up by the hydrogel polymer coating.

Example 10: A sample of a silk yarn made from silk-worms was placed in a beaker with aqueous chlorine dioxide solution—the silk yarn absorbs solution, bloats, and starts unfolding within seconds. This process was repeated with a fresh sample of the silk yarn weighing 0.1614 g that was placed in a closed jar with concentrated aqueous chlorine dioxide solution (1000 ppm) for about 1 hour. The silk yarn sample was then moved to a clean, dry jar with a chlorine dioxide indicator strip and spore indicator strips and allowed to sit for 3-4 hours. The chlorine dioxide indicator strip showed a color change commensurate with >500 ppm chlorine dioxide in 5-10 min, and so ClO$_2$ was off-gassing from the solution absorbed in the silk yarn, but the BT and *Bacillus atrophaeus* spore indicators did not change color, indicative of spore survival rather than spore kill for each type of spore.

The foregoing description was primarily directed to one or more aspects of the composition and methods provided for by the present disclosure. Although some attention has been given to various alternatives within the scope of the disclosure, it is anticipated that one skilled in the art will likely realize additional alternatives that are now apparent from the aspects of the composition and methods provided above. Accordingly, the scope of the present disclosure should be determined from the following claims and not limited by the above description.

The invention claimed is:

1. An article comprising:
a substrate having a stimuli-responsive hydrogel polymer functionalized to a surface, the stimuli-responsive hydrogel polymer being at least partially hydrated by a pre-made aqueous disinfectant solution comprising a disinfectant, wherein the pre-made aqueous disinfec-tant solution is formed prior to hydrating the stimuli-responsive hydrogel polymer, and wherein at least a portion of the pre-made aqueous disinfectant solution is taken up by, stored in, or released from the stimuli-responsive hydrogel polymer as an aqueous solution or a gaseous vapor based upon one or more stimulus changes, wherein functionalization of the surface of the substrate with the stimuli-responsive hydrogel polymer includes covalently bonding the stimuli-responsive hydrogel polymer to the substrate.

2. The article of claim 1, wherein the article is self-deodorizing, self-cleaning, self-decontaminating, self-pro-tecting, self-stabilizing, or a combination thereof by virtue of the stimuli-responsive hydrogel polymer being at least partially hydrated by the aqueous disinfectant solution com-prising the disinfectant.

3. The article of claim 1, wherein the substrate is or forms part of a textile, a fabric, an article of clothing, a packaging material, a polymeric film, a container, or a combination thereof.

4. The article of claim 3, wherein the substrate is or forms part of the textile, the fabric, the article of clothing, or a combination thereof, wherein the textile, the fabric, the article of clothing, or a combination thereof is woven, knitted, or non-woven.

5. The article of claim 4, wherein the textile, the fabric, the article of clothing, or a combination thereof comprises natural fibers comprising cotton or wool, synthetic fibers comprising polyester, nylon, rayon, or dacron, or a combi-nation thereof.

6. The article of claim 3, wherein the substrate is or forms part of the packaging material, wherein the packaging mate-rial is a packaging film comprising polyethyleneterephtha-late, polylactic acid, polyhydroxyalkanoate, cellulose, starch, gelatin, polyethylene, polystyrene, or a combination thereof.

7. The article of claim 3, wherein the substrate is or forms part of the container, wherein the container is formed from a rigid or flexible plastic.

8. The article of claim 7, wherein the container is formed from polyethyleneterephthalate, polystyrene, polypropylene, or a combination thereof.

9. The article of claim 7, wherein the container stores, transports, or dispenses a cleaning solution that undergoes degradation by cross-reaction with an inner surface of the container.

10. The article of claim 1, wherein the disinfectant is chlorine dioxide.

11. The article of claim 10, wherein the aqueous disinfectant solution of chlorine dioxide is produced by the reduction of a stoichiometric excess of chlorite by 2-Amino-3-sulfhydrylpropanoic acid (the amino acid Cysteine).

12. The article of claim 10, wherein the aqueous disinfectant solution of chlorine dioxide eliminates odors or inactivates microorganisms selected from the group consisting of bacterial cells, bacterial spores of the *Bacillus* and *Clostridia* genera, yeasts, molds, mildews, fungal spores, and viruses.

13. The article of claim 1, wherein the stimuli-responsive hydrogel polymer functionalized to a surface is re-chargeable by interacting with a stimulus and capable of taking up, storing, and controllably releasing aqueous disinfectant solution containing disinfectant over multiple repeatable cycles.

14. The article of claim 1, wherein the stimuli-responsive hydrogel polymer functionalized to a surface is a thermo-responsive hydrogel polymer and the stimulus is a change in temperature.

15. The article of claim 14, wherein the stimuli-responsive hydrogel polymer comprises a derivative of N-isopropylacrylamide.

16. The article of claim 15, wherein the derivative of N-isopropylacrylamide is selected from the group consisting of poly-{N-isopropylacrylamide}, poly-{N-isopropylacrylamide-co-chitosan}, poly-{N-isopropylacrylamide-co-acrylic acid}, and combinations thereof.

17. The article of claim 14, wherein the thermoresponsive hydrogel polymer has a lower critical solubility temperature of between 20° C. and 40° C.

18. The article of claim 1, wherein the disinfectant is present in an amount suitable to release the disinfectant in an amount of between 1 ppm and 1000 ppm.

19. A sachet comprising the article of claim 1 and configured to be added as a wearable insert to clothing, outer-wear, or footwear; or as an insertable/removable sachet to be used inside a container, an enclosure, or a combination thereof, wherein the container or the enclosure is adapted to hold a contaminated item, wherein the sachet is optionally reinforced with a non-woven backing material.

20. A method of using a stimuli-responsive hydrogel polymer functionalized to a surface of a substrate that is at least partially hydrated by a pre-made aqueous disinfectant solution comprising a disinfectant, the method comprising providing a stimulus change to the stimuli-responsive hydrogel polymer, thereby controllably taking up, storing, or releasing at least a portion of the pre-made aqueous disinfectant solution, wherein functionalization of the surface of the substrate with the stimuli-responsive hydrogel polymer includes covalently bonding the stimuli-responsive hydrogel polymer to the substrate.

21. The article of claim 1, wherein the stimulus change is a temperature change.

22. The article of claim 21, wherein at least the portion of the aqueous disinfectant solution is taken up by and stored in the stimuli-responsive hydrogel polymer at a temperature of below a lower critical solution temperature (LCST) of the stimuli-responsive hydrogel polymer.

23. The article of claim 22, wherein at least the portion of the aqueous disinfectant solution is released from the stimuli-responsive hydrogel polymer at a temperature change from below the LCST to above the LCST.

24. The method of claim 20, wherein the stimulus change is a temperature change.

25. The method of claim 24, wherein forming the partially hydrated stimuli-responsive hydrogel polymer includes contacting the stimuli-responsive hydrogel polymer with the aqueous disinfectant solution at a temperature below a lower critical solution temperature (LCST) of the stimuli-responsive hydrogel polymer.

26. The method of claim 25, wherein releasing the aqueous disinfectant solution from the partially hydrated stimuli-responsive hydrogel polymer includes contacting the partially hydrated stimuli-responsive hydrogel polymer at a temperature above the LCST.

27. The article of claim 1, wherein the covalent bonding includes coating the surface of the substrate with the stimuli responsive hydrogel using one of ultraviolet (UV) light irradiation, atomic vapor deposition, or chemical vapor deposition.

28. The method of claim 20, wherein the covalent bonding includes coating the surface of the substrate with the stimuli responsive hydrogel using one of ultraviolet (UV) light irradiation, atomic vapor deposition, or chemical vapor deposition.

* * * * *